United States Patent [19]
Point et al.

[11] Patent Number: 5,066,204
[45] Date of Patent: Nov. 19, 1991

[54] DIAPHRAGM PUMP

[75] Inventors: Jacques Point, Annecy; Pierre Joulia, Saint Jorioz, both of France

[73] Assignee: Rena S.A., Meythet, France

[21] Appl. No.: 546,315

[22] Filed: Jul. 2, 1990

[30] Foreign Application Priority Data

Jul. 7, 1989 [FR] France .................. 89 09902

[51] Int. Cl.$^5$ .................. F04B 17/00; H02K 33/00
[52] U.S. Cl. .................. 417/413; 417/410; 310/36
[58] Field of Search .................. 417/410, 413; 310/36

[56] References Cited
U.S. PATENT DOCUMENTS

| | | | |
|---|---|---|---|
| 3,635,592 | 1/1972 | Kolfertz | 417/413 |
| 3,664,767 | 5/1972 | Kolfertz | 417/416 |
| 4,063,826 | 12/1977 | Riepe | 417/410 |

FOREIGN PATENT DOCUMENTS 051285 3/1986 Fed. Rep. of Germany .
516253 1/1972 Switzerland .

Primary Examiner—Richard A. Bertsch
Assistant Examiner—Alfred Basichas
Attorney, Agent, or Firm—Browdy and Neimark

[57] ABSTRACT

A diaphragm pump intended to pump gases or highly-volatile liquids include a vibrating arm (6) acting on a diaphragm (5) placed into oscillation by a fixed electromagnet (7) fed with alternating or direct electric current. The vibrating arm (6) is composed of a single piece of plastic material, with an enlarged head (11) integrally molded with at least one permanent magnet (9) located opposite electromagnet (7). Opposite the head (11), the vibrating arm (6) has an elastically deformable part (12) attaching the arm to pump housing (1).

4 Claims, 1 Drawing Sheet

U.S. Patent   Nov. 19, 1991   5,066,204
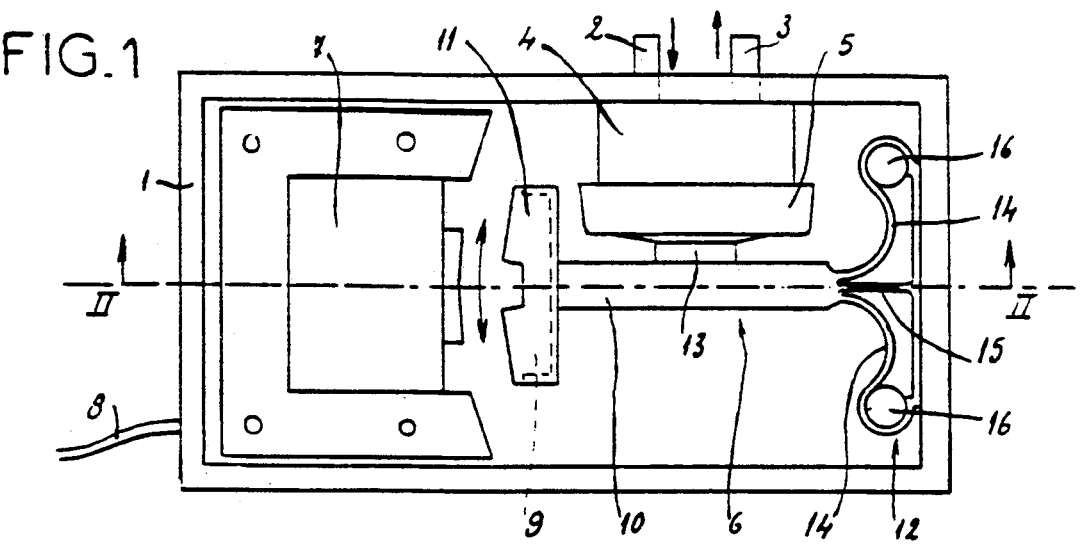
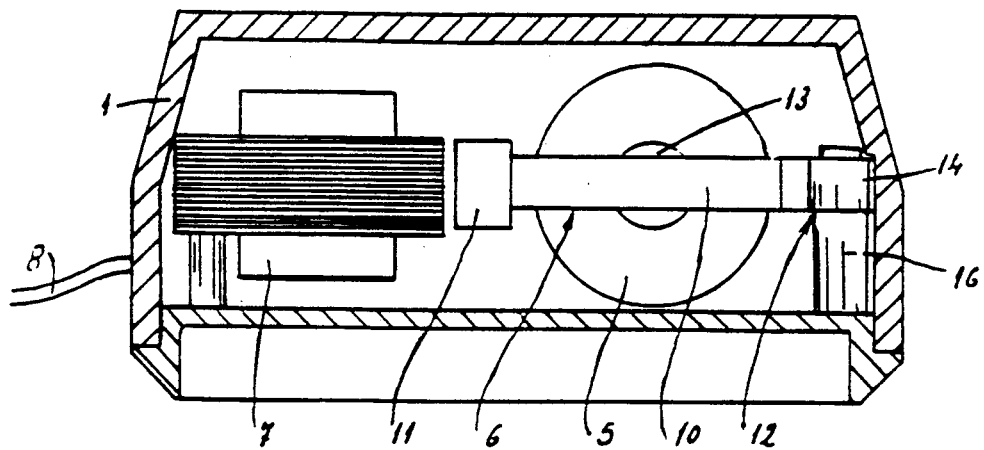
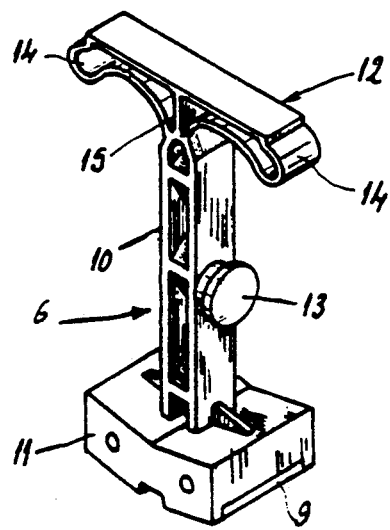

5,066,204

DIAPHRAGM PUMP

FIELD OF THE INVENTION

This invention pertains to a diaphragm pump intended primarily for pumping gases such as air, but also applicable to pumping highly volatile liquids.

More specifically, this invention pertains to a diaphragm pump wherein a vibrating arm acting on the diaphragm which serves for the suction and lift of the fluid to be pumped is set into oscillation by a fixed electromagnet fed with alternating or direct electric current, one end of the vibrating arm being connected to the pump housing and the other end holding at least one permanent magnet located opposite the electromagnet.

BACKGROUND

In known construction of this general type of diaphragm pump, the vibrating arm is composed of a cut-out and arched steel blade, which acts as a spring. One end of the blade is made solidary with the pump housing by screws, nuts and washers. The other end of the blade is molded of a plastic material, making it solidary with one or more magnets.

Present constructions thus require a certain number of different parts, entailing a complicated structure and a fairly high production cost. Furthermore, the arching of the blade gives the arm an asymmetrical structure, which results in fatigue of the material and plastic flow over time.

SUMMARY OF THE INVENTION

This invention aims to eliminate these problems in known embodiments by supplying a diaphragm pump of the general type noted above and having a vibrating arm that is simplified in its structure and assembly, thus yielding an appreciable savings in production, while avoiding the phenomenon of plastic flow over time.

For this purpose, in the diaphragm pump according to the invention, the vibrating arm is composed of a single piece of plastic material, with an enlarged head molded with permanent magnet(s), and with a part ensuring its attachment in the housing, opposite the head.

In a preferred embodiment of the invention, the part attaching the vibrating arm in the housing comprises two symmetrical loops made of thin sheets of elastically-deformable plastic material which are designed to be fitted on fixed elements such as teats or shafts that are part of the housing, while acting as springs. In this way, the shapes and thicknesses of these loops formed by molding determine the desired mechanical properties of the vibrating arm, and allow this arm to be mounted simply in the pump housing without screws or other additional fixation components.

According to a variation of this invention, especially applicable to small pumps, the plastic vibrating arm is molded in one piece integral with the pump housing, which further simplifies construction.

BRIEF DESCRIPTION OF DRAWING

In any event, the invention will be better understood through the description below in reference to the accompanying schematic drawing, representing an embodiment of the diaphragm pump of the present invention as a non-restrictive example:

FIG. 1 is a front view of a diaphragm pump according to this invention, shown open so that the inside components may be seen;

FIG. 2 is a longitudinal sectional view of said pump along line II—II in FIG. 1;

FIG. 3 is a perspective view of the vibrating arm alone.

DETAILED DESCRIPTION

FIGS. 1 and 2 show an air pump whose components are lodged inside a pump housing 1 crossed laterally by an air intake 2 and by an air outlet 3. Air intake 2 and air outlet 3 are connected to a pump body 4, covered by a deformable membrane 5. To deform membrane 5 alternatively, a vibrating arm 6 is provided, set into oscillation by a fixed electromagnet 7 whose coil is fed with alternating or direct electric current by suitable conductors, e.g. wires 8. One end of the vibrating arm 6 is connected to the interior of its pump housing 1 in a manner that will be described in detail below, while its opposite end holds at least one permanent magnet 9, located opposite the electromagnet 7. An intermediary point of the vibrating arm 6 is connected to membrane 5.

The invention pertains more specifically to the structure of vibrating arm 6, also shown in FIG. 3. The arm 6 is composed of a single plastic piece, including an elongated shaft 10, an enlarged head 11 and, opposite head the 11, a foot 12 for attachment in and to the housing 1. In the area of its longitudinal midpoint, the elongated shaft 10, made fairly rigid by the thickness of the plastic material from which it is formed, has a lateral teat or extension 13 that connects the vibrating arm 6 with the membrane 5. The enlarged head 11 is molded with permanent magnet(s) 9 embedded or united therewith.

On the contrary, the foot 12 of vibrating arm 6 is formed of relatively thin sheets or sections 14 and 15 of plastic material, allowing elastic deformation. These thin sheets 14 and 15 of plastic material primarily form two symmetrical loops 14 and the central sheet 15 extending in the plane of symmetry of the two loops 14 and connected to the two loops 14. The two symmetrical loops 14 have straight parts which press against an inside surface of the housing 1, and incurvated parts designed to be fitted to attaching elements, e.g. posts or shafts 16, having complementary shapes, which are part of housing 1.

The diaphragm pump described herein can be used as an aquarium aerator, among other applications.

Of course, the invention is not limited solely to the embodiment of said diaphragm pump described as an example above; on the contrary, it encompasses all variations of embodiments and applications following the same principle. In particular, the following variations would not depart from framework of the invention:

Using constructive modifications concerning the details in the shape of the vibrating arm, for example;

Using specific adaptations such as the embodiment of a pump endowed with two vibrating arms made and attached according to the principle of this invention;

Using all variations concerning the electricity supply of the electromagnet, which can be provided either with alternating current from the power system, or direct current from cells or batteries;

Using a different application, such as pumping gases other than air, even highly volatile liquids.

What is claimed is:

1. In a diaphragm pump for pumping gases or highly volatile liquids, comprising a vibrating arm acting on a diaphragm which serves for the suction and lift of the fluid to be pumped and placed into oscillation by a fixed electromagnet, one end of the vibrating arm being connected to pump housing and the other end holding at least one permanent magnet located opposite the electromagnet, the improvement wherein said vibrating arm is composed of a single piece o plastic material with an enlarged head molded to said at least one permanent magnet, and having a part of said arm opposite said head attaching said arm within said housing; and wherein said part attaching said vibrating arm within said housing comprises two symmetrical loops made of thin elastically-deformable sheets of plastic material and attached to attaching elements that are part of said housing, said sheets comprising spring means.

2. A diaphragm pump according to claim 1, wherein said attaching elements are posts, and said two symmetrical loops (14) comprise straight parts pressing against an inside surface of housing (1) and incurvated parts surrounding and attached to said posts.

3. Diaphragm pump according to claim 1, wherein said arm (6) further comprises a central sheet of material (15) in the plane of symmetry of the two loops (14) and connected to said two loops (14).

4. In a diaphragm pump for pumping gases or highly volatile liquids, comprising a vibrating arm acting on a diaphragm which serves for the suction and lift of the fluid to be pumped and placed into oscillation by a fixed electromagnet, one end of the vibrating arm being connected to pump housing and the other end holding at least one permanent magnet located opposite the electromagnet, the improvement wherein said vibrating arm is composed of a single piece o plastic material with an enlarged head molded to said at least one permanent magnet, and having a part of said arm opposite said head attaching said arm within said housing; and wherein said vibrating arm made of plastic material is molded in a single piece with said pump housing.

* * * * *